(12) United States Patent
Roman-Sanchez et al.

(10) Patent No.: US 10,599,182 B1
(45) Date of Patent: Mar. 24, 2020

(54) DOCKING STATION APPARATUS

(71) Applicant: The United States of America as Represented by the Secretary of the Navy, Indian Head, MD (US)

(72) Inventors: Juan C. Roman-Sanchez, Alexandria, VA (US); Andrew Czop, Alexandria, VA (US); Carlos Ramos Garcia, Waldorf, MD (US); Michael DelSignore, White Plains, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/998,265

(22) Filed: Jul. 27, 2018

(51) Int. Cl.
*G06F 1/16* (2006.01)
(52) U.S. Cl.
CPC .................................. *G06F 1/1632* (2013.01)
(58) Field of Classification Search
CPC ..................................................... G06F 1/1632
USPC ........................................ 361/679.41–679.44
See application file for complete search history.

(56) References Cited

U.S. PATENT DOCUMENTS

| | | | | |
|---|---|---|---|---|
| 5,966,285 A * | 10/1999 | Sellers | ................ | B60R 11/0252 108/44 |
| 6,151,218 A * | 11/2000 | Pirdy | ................... | G06F 1/1632 361/679.41 |
| 6,189,788 B1 * | 2/2001 | Sherman | ................... | B41J 3/36 235/383 |
| 6,236,571 B1 * | 5/2001 | Dohi | ..................... | G06F 1/1632 361/679.45 |
| 6,424,524 B2 * | 7/2002 | Bovio | .................. | G06F 1/1632 361/679.45 |
| 6,742,070 B2 * | 5/2004 | Fuchida | ................ | G06F 1/1632 307/50 |
| 6,989,217 B2 * | 1/2006 | Suto | ..................... | H01M 2/1027 220/500 |
| 7,440,275 B2 * | 10/2008 | Schedivy | ............ | B60R 11/0211 206/320 |
| 8,179,672 B2 | 5/2012 | Carnevali | | |
| D726,188 S | 4/2015 | Lu et al. | | |

(Continued)

OTHER PUBLICATIONS https://www.havis.com/catalog/tablet_docking_cradles-5901-1.html Pictures attached.

*Primary Examiner* — Daniel P Wicklund
*Assistant Examiner* — Sagar Shrestha
(74) *Attorney, Agent, or Firm* — Fredric J. Zimmerman

(57) ABSTRACT

A docking station apparatus (apparatus) for a portable electronic device such as a laptop computer. The apparatus includes a base section having electronic circuitry, electrical wiring and at least one battery compartment. A support section is attached to the base section and includes a bearing surface for receiving a portable electronic device. The apparatus further includes an enclosure structure attached to the support section for retaining the portable electronic device on the bearing surface. The enclosure structure includes a rear wall and sidewalls configured parallel to each other and contiguous with the rear wall. The bearing surface extends between the sidewalls of the enclosure structure. The rear wall and sidewalls of the enclosure structure are substantially perpendicular to the bearing surface. The enclosure structure includes at least one electrical connector electrically connected to the electronic circuitry within the base section.

23 Claims, 8 Drawing Sheets

(56) References Cited

U.S. PATENT DOCUMENTS

| | | | |
|---|---|---|---|
| D732,036 S | 6/2015 | Lee et al. | |
| 9,320,632 B1 | 5/2016 | Chang et al. | |
| D780,762 S | 3/2017 | Ju | |
| D781,438 S | 3/2017 | Dressler | |
| 9,798,357 B2 | 10/2017 | Senatori | |
| 9,857,842 B2 | 1/2018 | Eliyahu | |
| 2006/0061958 A1* | 3/2006 | Solomon | G06F 1/1632 361/679.43 |
| 2006/0293098 A1* | 12/2006 | Lin | G06F 1/1632 455/575.8 |
| 2008/0270664 A1 | 10/2008 | Carnevali | |
| 2009/0063745 A1* | 3/2009 | Morris | F16M 13/00 710/304 |
| 2009/0213536 A1 | 8/2009 | Lewandowski | |
| 2010/0193656 A1* | 8/2010 | Wilkenfeld | F16M 13/00 248/440.1 |
| 2010/0195279 A1* | 8/2010 | Michael | G06F 1/1632 361/679.41 |
| 2014/0355200 A1* | 12/2014 | Thiers | H04W 88/02 361/679.41 |

\* cited by examiner

DOCKING STATION APPARATUS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

FIELD OF THE INVENTION

The present invention relates to a docking station apparatus for use with a portable electronic device such as a notebook computer or laptop computer.

BACKGROUND

Docking stations are known in the art and are used with portable computers such as notebook and laptop computers. Many conventional docking stations are designed for use in protected environments such as offices, homes and vehicles. However, there are many situations in which docking stations must be used outdoors and in poor weather conditions. Examples of such situations include emergencies, natural disasters, law enforcement activity or military operations.

What is needed is a new and improved docking station apparatus that may be used in all types of outdoor environments and situations.

SUMMARY OF THE INVENTION

It is an aspect of the invention to provide a docking station apparatus for a portable electronic device such as a notebook computer or a laptop computer. In an exemplary embodiment, the docking station apparatus includes a base section having electronic circuitry and components, electrical wiring and at least one battery compartment. The docking station apparatus further includes a support section that is attached to the base section and has a bearing surface for receiving a portable electronic device. The docking station apparatus further includes an enclosure structure attached to the support section for retaining the portable electronic device on the bearing surface. The enclosure structure includes a rear wall and sidewalls that are parallel to each other and contiguous with the rear wall. The bearing surface extends between the sidewalls of the enclosure structure. The rear wall and sidewalls of the enclosure structure are substantially perpendicular to the bearing surface. The enclosure structure includes one or more electrical connectors that are electrically connected to the electronic circuitry of the base section.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular exemplary embodiments disclosed in this summary section.

DETAILED DESCRIPTION OF EXEMPLARY EMBODIMENTS OF THE INVENTION

Figure 1:
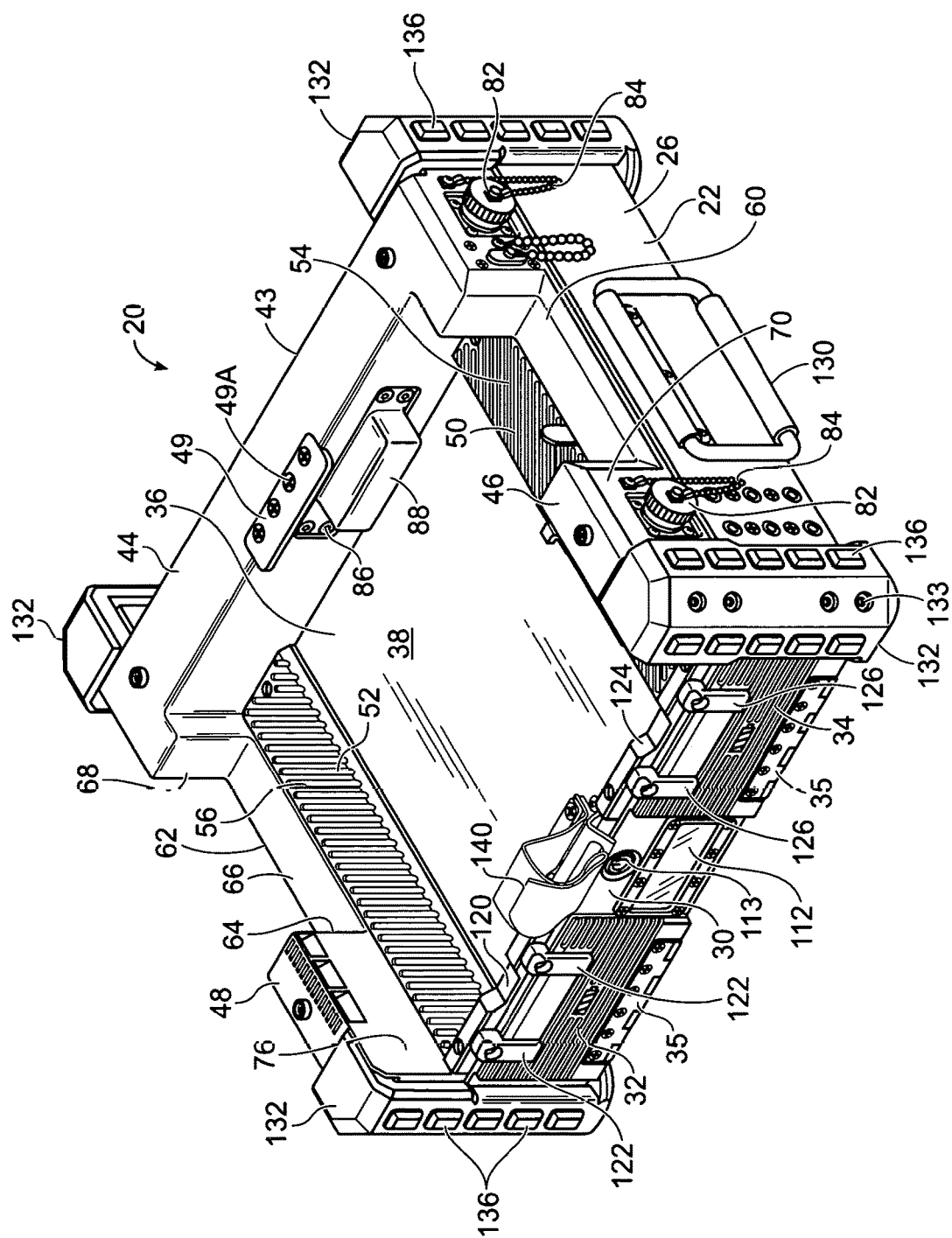
FIG. 1 is a perspective view of a docking station apparatus in accordance with an exemplary embodiment of the present invention, the view showing the front side and left side of the docking station apparatus.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

It is to be understood that throughout this description, terms such as "vertical", "horizontal", "top", "bottom", "upper", "lower", "middle", "above", "below" and the like are used for convenience in identifying relative locations of various components and surfaces relative to one another in reference to the drawings and that the docking station apparatus may be installed and used in substantially any orientation so that these terms are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Referring to FIGS. 1-6, there is shown docking station apparatus 20 in accordance with an exemplary embodiment of the invention. Docking station apparatus 20 is configured to work with a portable electronic device 40 such as a notebook computer or laptop computer. For purposes of describing the invention, portable electronic device 40 shall be referred to herein as laptop computer 40. Laptop computer 40 includes handle 41 that is configured so that there is a space or gap 42 between handle 41 and the body of laptop computer 40. Docking station apparatus 20 includes base section 22, which has rear wall 24 (see FIG. 6) and opposite sides 26 and 28 that are parallel to each other and contiguous with rear wall 24. Base section 22 includes bottom side 29 and front side 30. Base section 22 includes screw inlets 31 at each corner for receiving screws 133. As will be described in the ensuing description, screws 133 are used to attach corner bumper members 132 to docking station apparatus 20. Front side 30 includes doors 32 and 34 that are movably attached to base section 22. In an exemplary embodiment, doors 32 and 34 are hingedly attached to base section 22 via hinges 35. The purpose of doors 32 and 34 is described in the ensuing description. Docking station apparatus 20 further includes support section 36 that is attached to base section 22 and includes bearing surface 38 for receiving laptop computer 40. In one exemplary embodiment, an electrically insulating gasket (not shown) is interposed between support section 36 and base section 22. Docking station apparatus 20 includes enclosure structure 43 that is attached to support section 36. As shown in FIG. 7, support section 36 includes peripheral portion 39 upon which enclosure structure 43 is positioned. Any suitable techniques or fastening devices may be used to attach enclosure structure 43 to support section 36. In one exemplary embodiment, an electrically insulating gasket (not shown) is interposed between support section 36 and enclosure structure 43. Enclosure structure 43 retains laptop computer 40 in the correct position on bearing surface 38. Enclosure structure 43 includes rear wall 44 and sidewalls 46 and 48. Sidewalls 46 and 48 are parallel to each other and contiguous with rear wall 44. Bearing surface 38 extends between sidewalls 46 and 48. In an exemplary embodiment, rear wall 44 and sidewalls 46 and 48 are substantially perpendicular to bearing surface 38.

Figure 8:
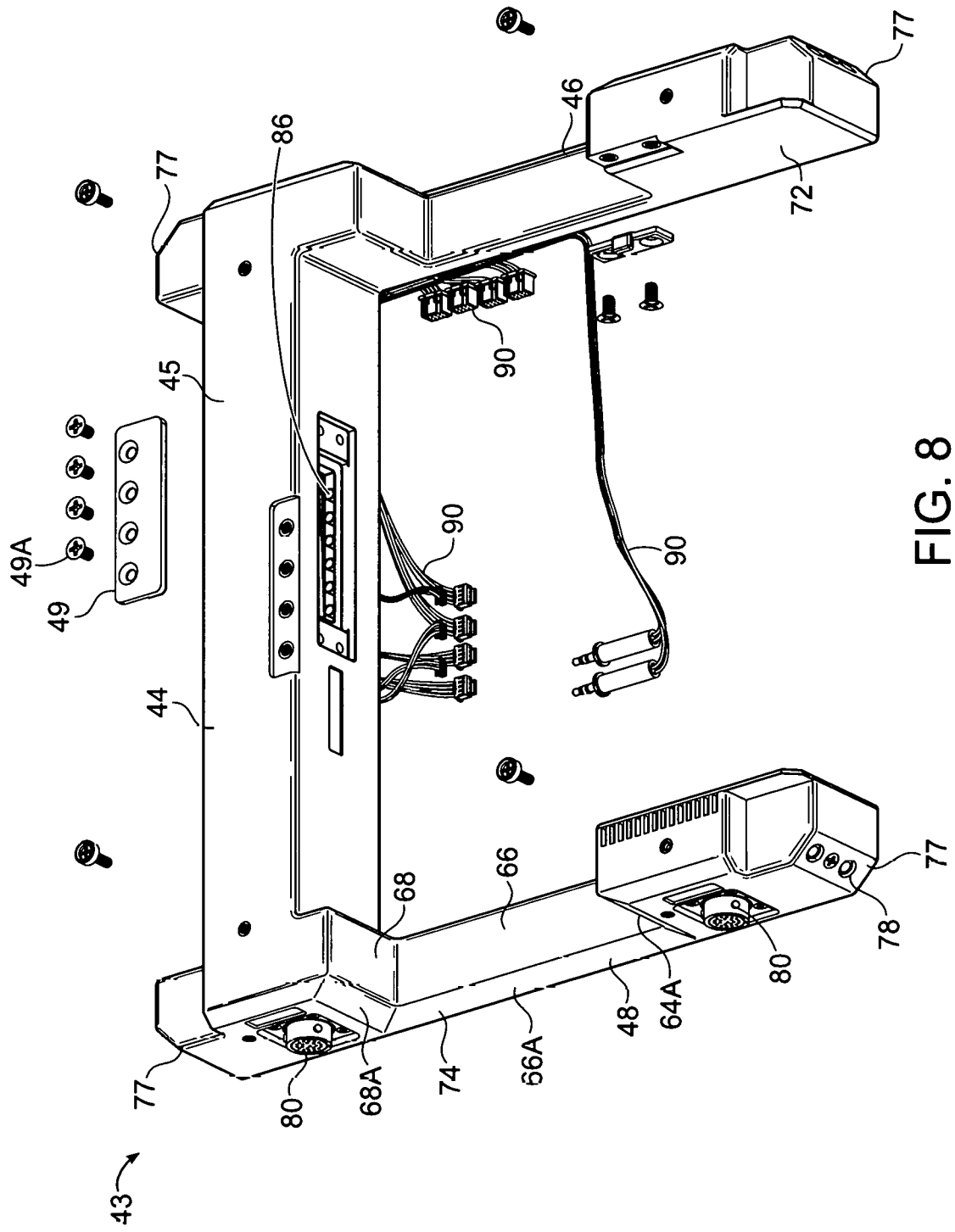
FIG. 8 is a perspective view an enclosure structure of the docking station apparatus.
Figure 10:
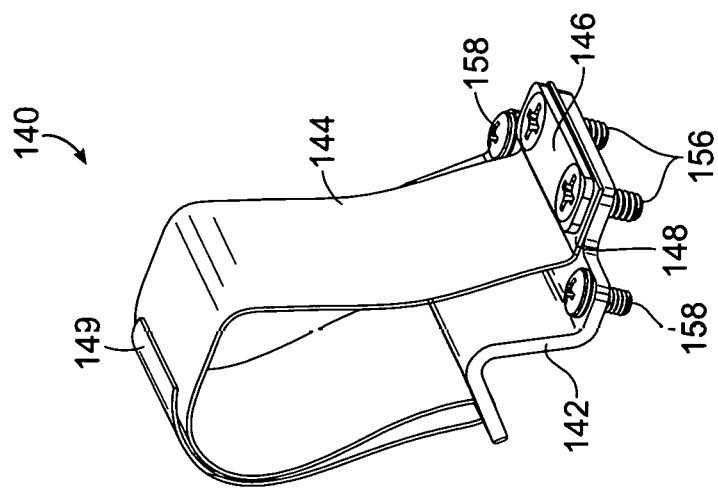
FIG. 10 is a perspective view of the strap assembly completely assembled.
Figure 9:
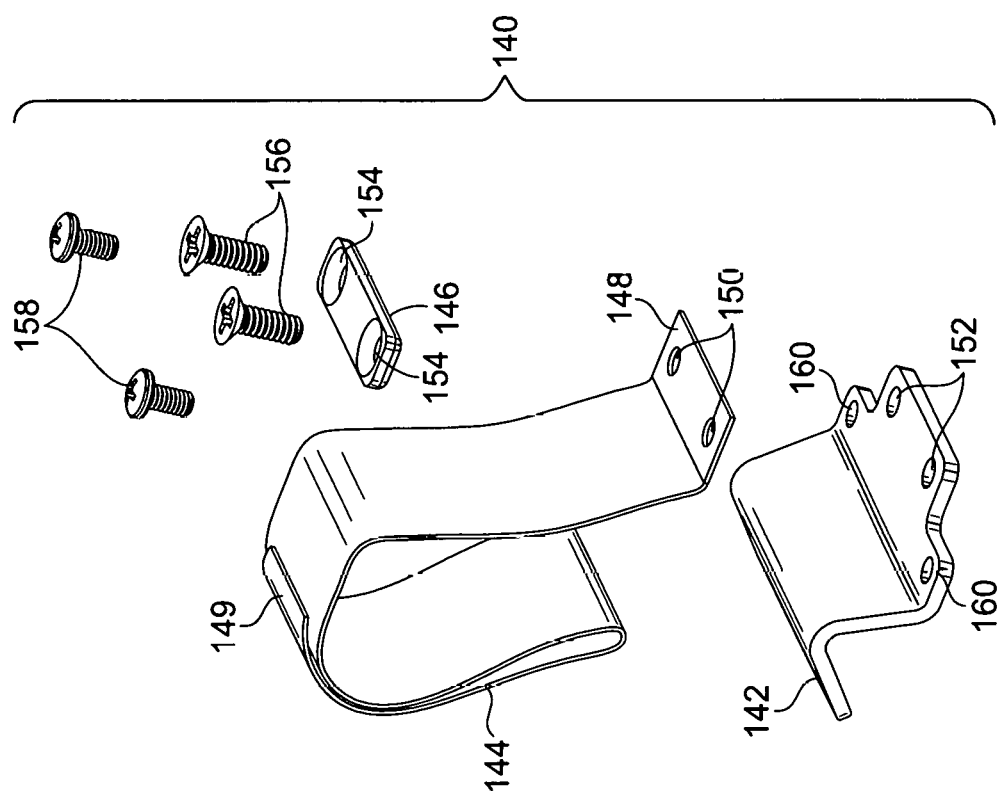
FIG. 9 is an exploded view of a strap assembly of the docking station apparatus.

Referring to FIGS. 1 and 8, docking station apparatus 20 further includes support plate 49 that is attached to top portion 45 of rear wall 44. Support plate 49 is positioned and sized to engage a portion of the rear side of laptop computer 40. Specifically, support plate 49 is sized for insertion or placement into a corresponding notch (not shown) that is on the rear side of laptop computer 40. In an exemplary embodiment, support plate 49 is removably attached to top portion 45 of rear wall 44 via screws 49A or other suitable fasteners.

Figure 2:
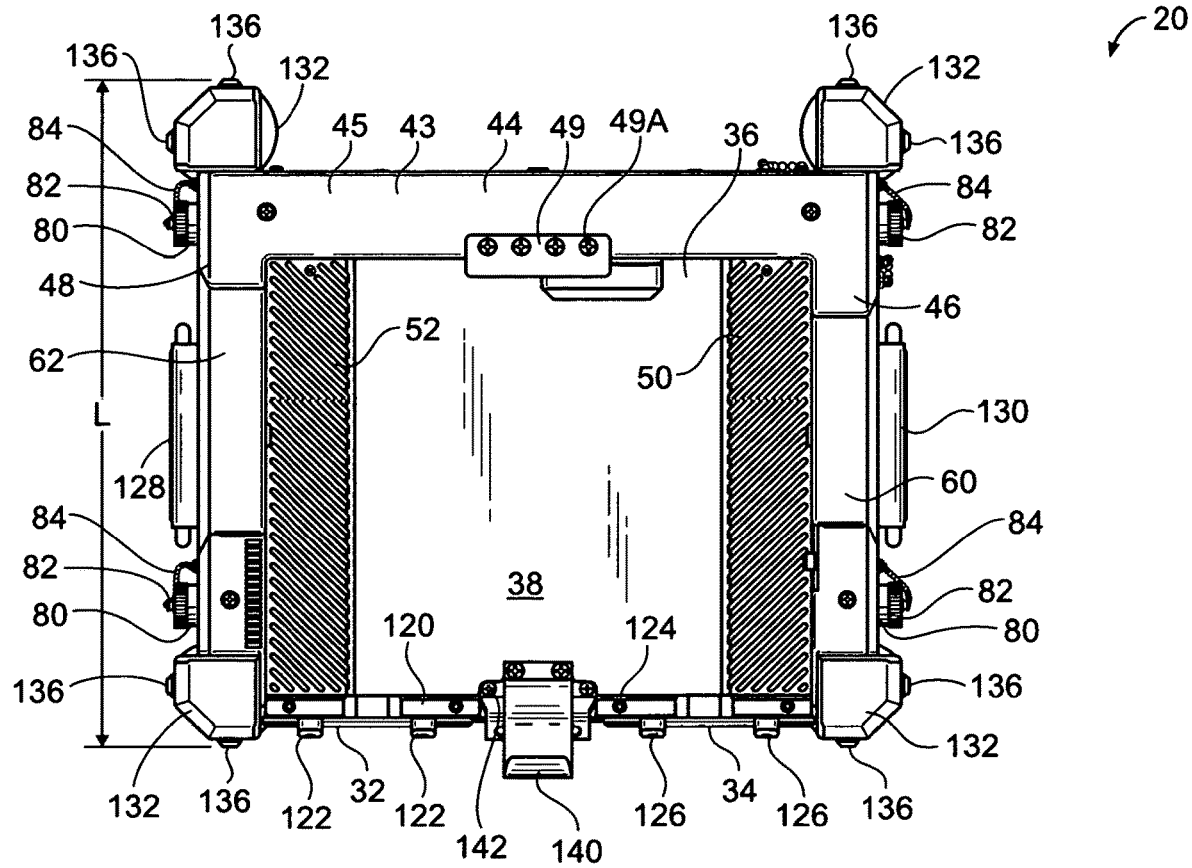
FIG. 2 is a top plan view of the docking station apparatus.

Referring to FIGS. 1, 2 and 7, bearing surface 38 includes raised sections 50 and 52 that are adjacent to sidewalls 46 and 48, respectively, of enclosure structure 43. Raised sections 50 and 52 contact the bottom side of laptop computer 40. In an exemplary embodiment, raised sections 50 and 52 may have a plurality of ridges 54 and 56, respectively, arranged in juxtaposition. In other embodiments, raised sections 50 and 52 may have other geometrical configurations. In an exemplary embodiment, raised sections 50 and 52 are separate panels that are attached to bearing surface 38. In such an embodiment, each panel is fabricated from any suitable material including plastic or crystalline plastic, natural rubber, neoprene, nitrile, butyl, and resin. In an exemplary embodiment, each panel is fabricated from Delrin® Acetal Homopolymer. In another embodiment, bearing surface 38 only has a single raised section 50 or raised section 52. In a further embodiment, bearing surface 38 is configured to have a single raised section located in the center of bearing surface 38. Support section 36 includes upstanding guide member 58 that is between raised section 50 and peripheral portion 39. Guide member 58 facilitates placement of enclosure structure 43 on peripheral portion 39.

Referring to FIGS. 1-4, sidewall 46 of enclosure structure 43 includes cut-out 60 therein that is sized to allow access to the CD drive and/or other data ports of laptop computer 40 while the laptop computer 40 is connected to the docking station apparatus 20. Cut-out 60 also allows a user to insert his or her hand therein in order to facilitate positioning laptop computer 40 on bearing surface 38 or lifting laptop computer 40 off of bearing surface 38. Similarly, sidewall 48 of enclosure structure 43 includes cut-out 62 therein that is sized to allow access to the USB, HDMI and/or Ethernet ports of the laptop computer 40 while the laptop computer 40 is connected to the docking station 20. Cut-out 62 also allows a user to insert his or her hand therein in order to facilitate positioning laptop computer 40 on bearing surface 38 or lifting laptop computer 40 off of bearing surface 38. Since cut-outs 60 and 62 are identical in shape, only cut-out 62 is described herein. Cut-out 62 includes first generally vertical surface 64, generally horizontal surface 66 that is contiguous with first generally vertical surface 64 and second generally vertical surface 68 that is contiguous with generally horizontal surface 66. In an exemplary embodiment, first generally vertical surface 64 has beveled edge 64A, generally horizontal surface 66 has beveled edge 66A and second generally vertical surface 68 has beveled edge 68A. In an exemplary embodiment, first generally vertical surface 64 is substantially perpendicular to generally horizontal surface 66 and second generally vertical surface 68 is substantially perpendicular to generally horizontal surface 66. However, in other embodiments, first generally vertical surface 64 and second generally vertical surface 68 may have other degrees of angulation with respect to generally horizontal surface 66.

Referring to FIGS. 1-4 and 8, sidewall 46 of enclosure structure 43 includes exterior side 70 and interior side 72. Interior side 72 confronts laptop computer 40. Similarly, sidewall 48 of enclosure structure 43 includes exterior side 74 and interior side 76. Interior side 76 confronts laptop computer 40. In some embodiments, each sidewall 46 and sidewall 48 is configured to have a predetermined thickness that results in the interior side 72 and interior side 76 physically contacting laptop computer 40. Enclosure structure 43 includes corner portions 77 which have screw inlets 78 for receiving screws 133 that are used to attach corner bumper members 132. Corner bumper members 132 are described in detail in the ensuing description. Docking station apparatus 20 further includes electronic signal connectors 80 that are attached to exterior side 70 and exterior side 74. Each electronic signal connector 80 includes removable dust cap 82 (see FIG. 1). Each dust cap 82 is attached to exterior side 70 and to exterior side 74 via a corresponding chain 84. Each electronic signal connector 80 may be any type of electronic signal connector that can handle digital signals and/or analog signals and/or power supply voltages. In another embodiment, there is only one electrical signal connector 80 on exterior side 70 and one electrical signal connector 80 on exterior side 74. Rear wall 44 of enclosure structure 43 includes electronic signal connector 86 that is configured to mate with a corresponding electronic signal connector (not shown) on the rear side of laptop computer 40. Removable dust cap 88 is removably attached to electronic signal connector 86. Referring to FIG. 8, enclosure structure 43 includes interior spaces or regions (not shown) located within rear wall 44 and within sidewalls 46 and 46 that contain electrical wires 90. Electrical wires 90 are electrically connected to electrical signal connectors 80 and 86.

Figure 6:
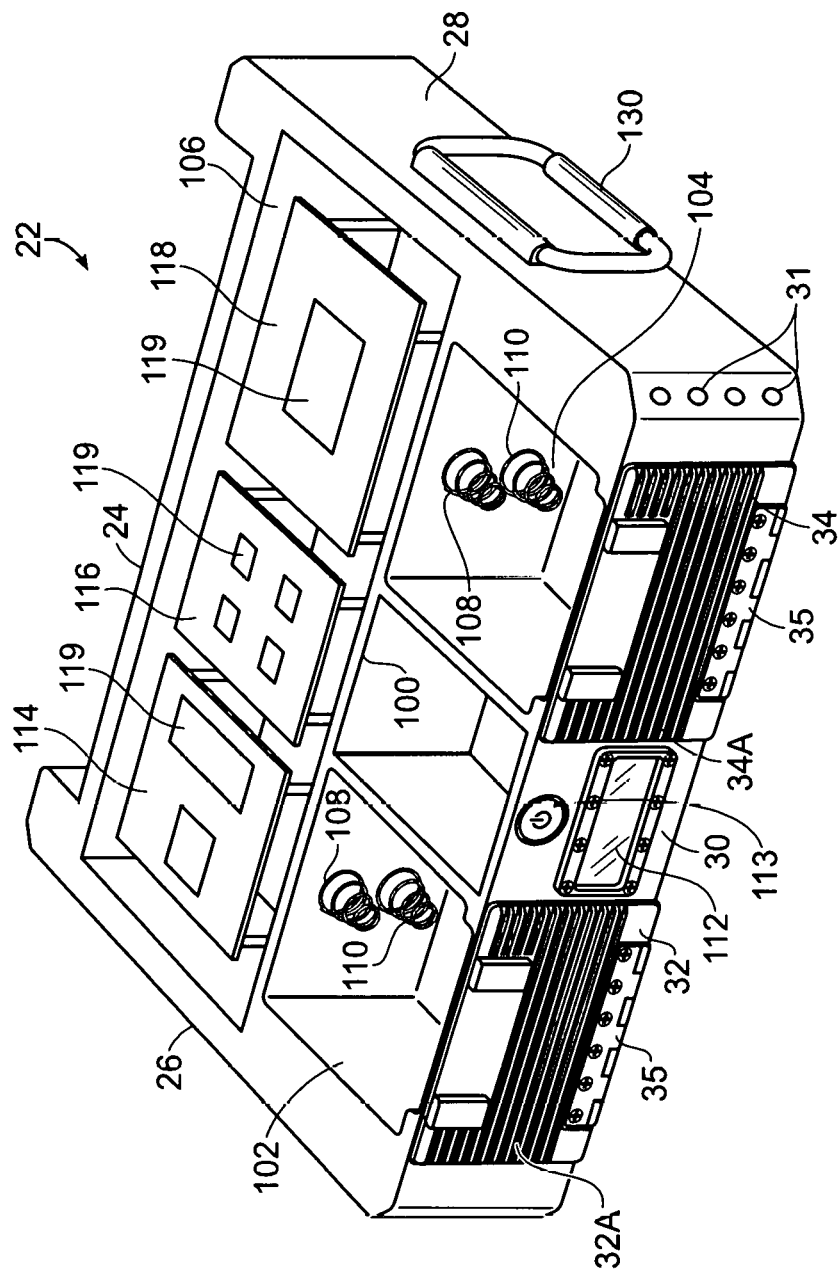
FIG. 6 is a perspective view of a base section of the docking station apparatus.
Figure 7:
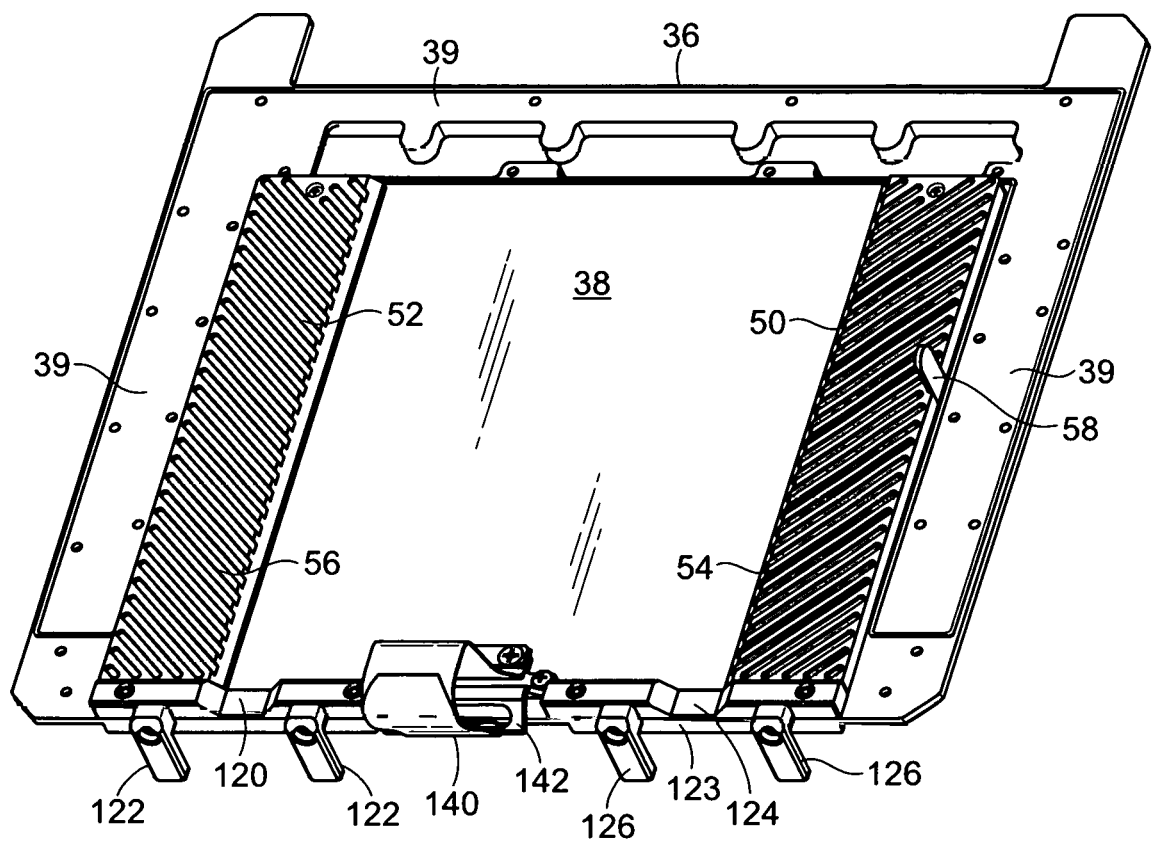
FIG. 7 is a perspective view of a support section of the docking station apparatus.

Referring to FIG. 6, base section 22 includes interior multi-partitioned structure 100 that defines a plurality of compartments including compartments 102, 104 and 106. In other exemplary embodiments, interior multi-partitioned structure 100 is configured to define less than or more than three compartments. Compartments 102 and 104 are battery compartments. In another exemplary embodiment, there is only one battery compartment. In a further embodiment, there are more than two battery compartments. Electrically conductive spring members 108 and 110 are attached to interior multi-partitioned structure 100 and located within compartments 102 and 104 for electrically contacting a battery when the battery is positioned in battery compartments 102 and 104. Docking station apparatus 20 further includes display device 112 and power switch 113. Power switch 113 is used to turn docking station apparatus 20 "on" or "off." In an exemplary embodiment, power switch 113 is a push-button switch. In an exemplary embodiment, display device 112 is a liquid crystal display (LCD). Display device 112 is activated upon start-up of docking station apparatus 20 and displays the cumulative amount of time that docking station apparatus 20 has been operated. Such a cumulative amount of time is often referred to as "run-time hours." The run-time hours are required in order to determine when docking station apparatus 20 is due for maintenance. Display device 112 also displays an amount of time that represents the estimate remaining life of the batteries. Docking station apparatus 20 further includes electronic circuit boards 114, 116 and 118 that are located within compartment 106. Electronic circuit boards 114, 116 and 118 include various electrical components thereon, collectively referred to by reference number 119 for purposes of simplicity. Electronic circuit boards 114, 116 and 118 are electrically connected to electrically conductive members 108 and 110, display device 112, power switch 113 and electrical wires 90 that are within enclosure structure 43 (see FIG. 8). Since electronic circuit boards 114, 116 and 118 are electrically connected to electrical wires 90, the electronic circuit boards 114, 116 and 118 are also electrically connected to electrical signal connectors 80 and 86. As a result of this configuration, when laptop computer 40 is positioned on bearing surface 38 and the rear connector (not shown) of laptop computer 40 is electrically connected to electrical connector 86, electronic signals from laptop computer 40 are routed to electronic circuit boards 114, 116 and 118 where the electronic signals are processed, stored, packetized or even re-routed to electrical connectors 80. Peripheral computer equipment or data processing devices (not shown) can be plugged into electrical connectors 80 in order to receive the electronic signals from electronic circuit boards 114, 116 and 118. The peripheral computer equipment or data processing devices (not shown) can also input electronic signals into electrical connectors 80 for the purposes of programming or re-programming laptop computer 40.

Figure 4:
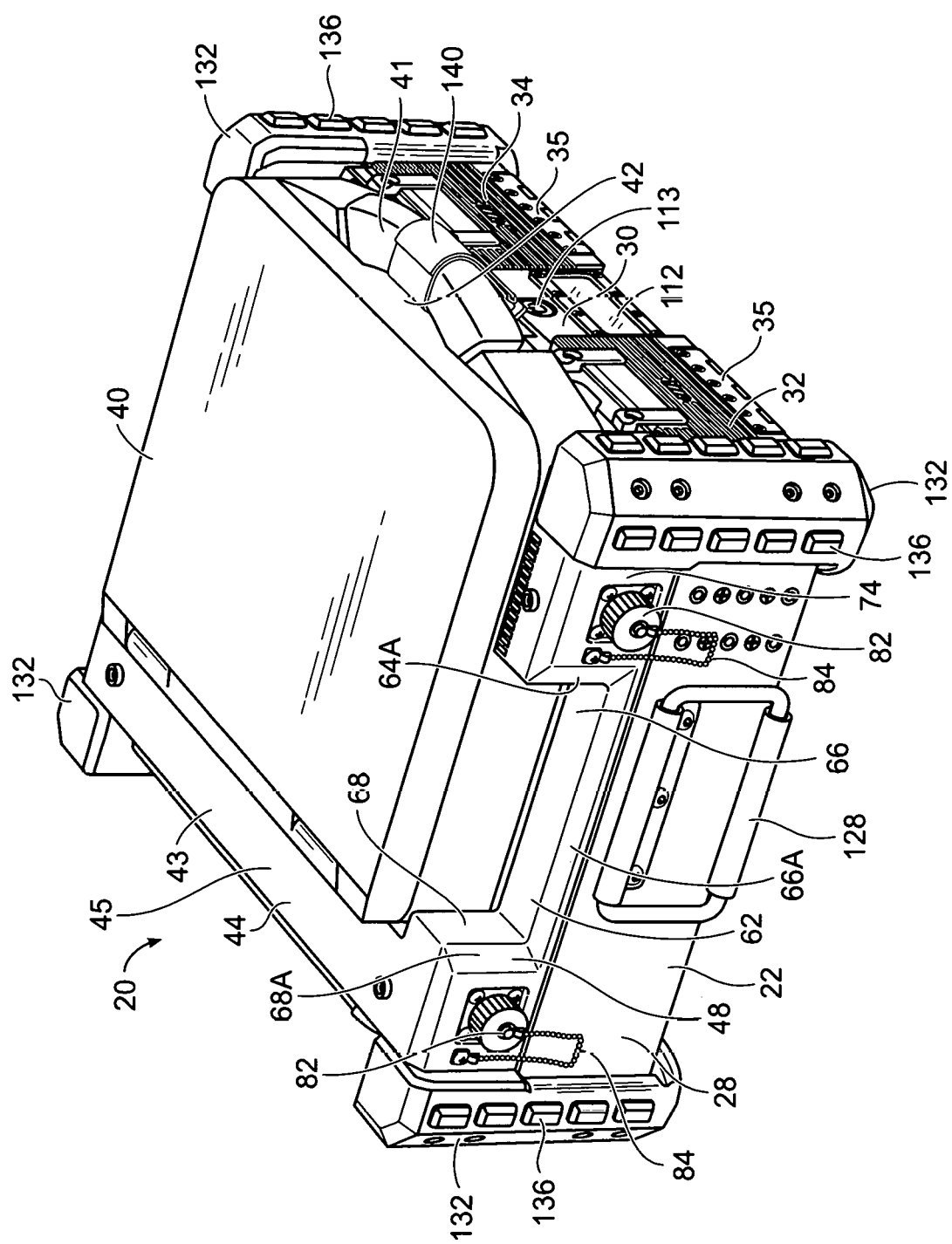
FIG. 4 is a perspective view of the docking station apparatus and a laptop computer secured to the docking station apparatus, the view showing the front side and right side of the docking station apparatus.

Referring to FIGS. 1, 4 and 6, doors 32 and 34 are movably attached to base section 22. Door 32 is movable to a closed position to prevent access to battery compartment 102 and to an open position that allows access to battery compartment 102. Similarly, door 34 is movable to a closed position to prevent access to battery compartment 104 and to an open position that allows access to battery compartment 104. Docking station apparatus 20 further includes a pair of door-lock assemblies. The first door-lock assembly includes door-lock support structure 120 and door-lock or latch 122 that is pivotably attached to door-lock support structure 120. Door-lock support structure 120 is attached to support section 36 and is adjacent to front edge 123 of support section 36. In order to lock door 32 in the closed position, the user first closes door 32 and then pivots door-lock 122 downward. Similarly, the second door-lock assembly includes door-lock support structure 124 and door-lock or latch 126 that is pivotably attached to door-lock support structure 124. Door-lock support structure 124 is attached to support section 36 and is adjacent to front edge 123 of support section 36. In order to open door 34, door-lock 126 is pivoted upward so door 34 can be opened. In order to lock door 34 in the closed position, the user first closes door 34 and then pivots door-lock 126 downward. In an exemplary embodiment, door 32 includes ribbed surface 32A and door 34 includes ribbed surface 34A (see FIG. 6).

As shown in FIGS. 1, 2, 4, and 6, handles 128 and 130 are attached to sides 26 and 28, respectively, of base section 22. Handles 128 and 130 facilitate carrying or transporting docking station apparatus 20. In an exemplary embodiment, handles 128 and 130 are pivotally or hingedly attached to sides 26 and 28 of base section.

Figure 3:
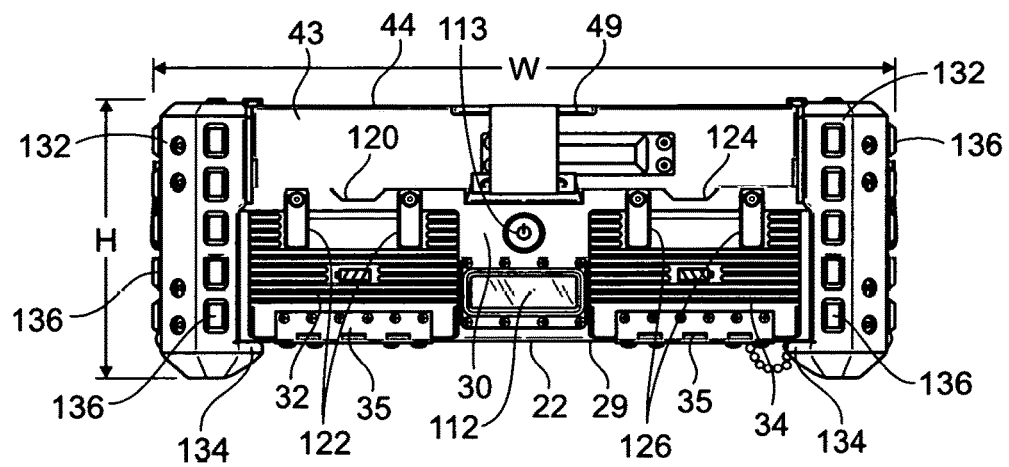
FIG. 3 is a front view of the docking station apparatus.
Figure 5:
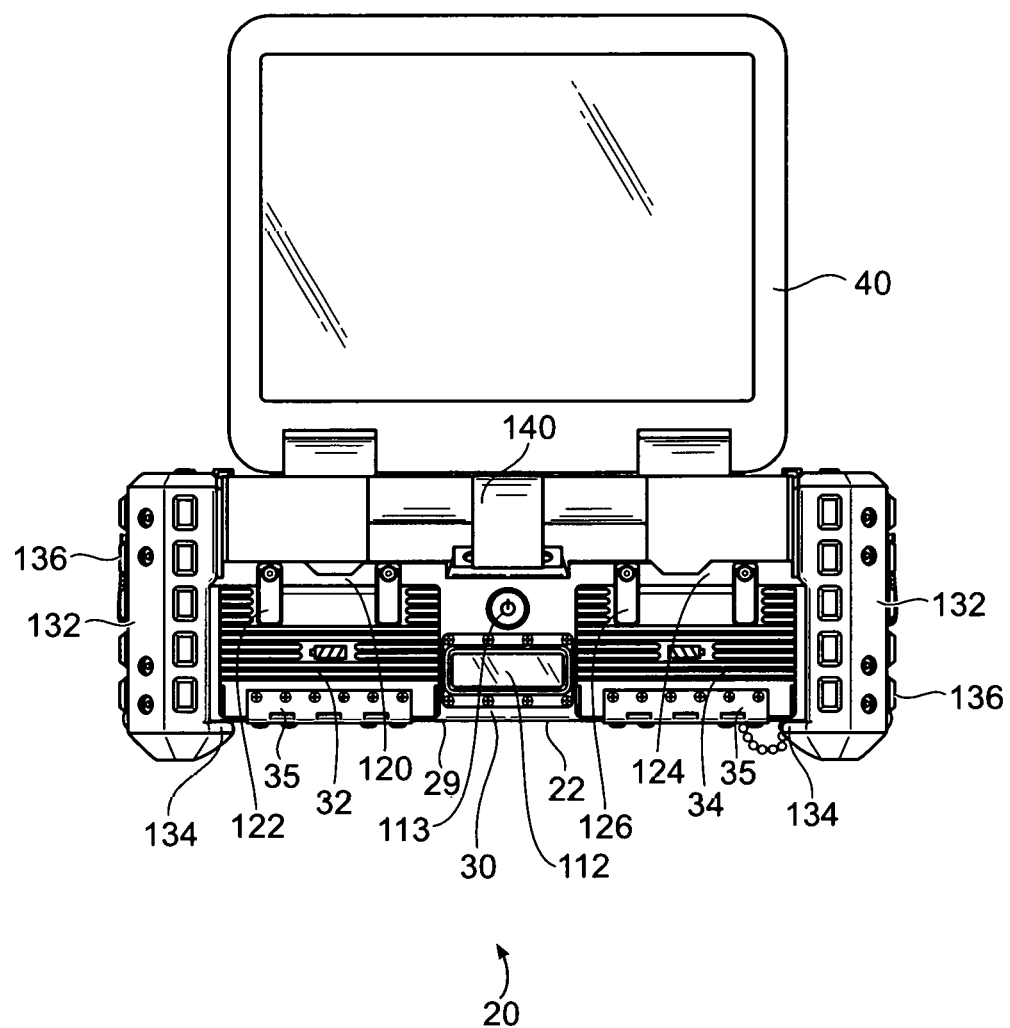
FIG. 5 is a front view of the docking station apparatus with the laptop computer in an open configuration.

Referring to FIGS. 1-3, docking station apparatus 20 further includes a plurality of corner bumper members 132. Each corner bumper member 132 is attached to a corresponding corner of docking station apparatus 20. In exemplary embodiment, each corner bumper member 132 is removably attached to a corresponding corner of docking station apparatus 20. Any suitable fastening technique can be used to removably attach each corner bumper member 132 to a corresponding corner. In one embodiment, screws 133 are used to removably attach each corner bumper member 132 to a corresponding corner. As shown in FIG. 5, each corner bumper member 132 includes portion 134 that extends over a portion of bottom side 29 of base section 22 so as to create a space between bottom side 29 and a surface upon which docking station apparatus 20 is placed. In one embodiment, each corner bumper member 132 includes a plurality of protrusions 136 that protrude sufficiently enough to physically contact objects or surfaces. Corner bumper members 132 protect docking station apparatus 20 from damage in the event docking station apparatus 20 is dropped or if it forcefully contacts a surface or another object. Each corner bumper member 132 may be fabricated from any one of a variety of suitable materials including natural rubber, neoprene, nitrile, butyl, plastic and resin.

Referring to FIGS. 1-4, 7, 9 and 10, front edge 123 of support section 36 is adjacent to front side 30 of base section 22. Docking station apparatus 20 further includes strap assembly 140 that is attached to front edge 123 for securing laptop computer 40 to bearing surface 38. Strap assembly 140 includes base 142, strap 144 and mounting plate 146. Strap 144 includes first end 148 and opposite second end 149. First end 148 includes holes 150 that are aligned with holes 152 in base 142. Mounting plate 146 has holes 154 that are aligned with holes 150. Screws 156 are inserted through holes 154 in mounting plate 146 and through holes 150 in first end 148 of strap 144 and through holes 152 in base 142. Screws 158 are inserted through holes 160 in base 142 and fastened to support section 36 in proximity to front edge 123. Strap 144 is fabricated from material that allows opposite second end 149 to be removably attached to other portions of strap 144. In order to further secure laptop computer 40 to docking station apparatus 20, a user first inserts opposite second end 149 through space or gap 42 between handle 41 and the body of laptop computer 40 and then removably attaches opposite second end 149 to another portion of strap 144. In an exemplary embodiment, strap 144 is a Velcro® Brand strap. In other embodiments, strap 144 is configured to have male snap members attached to opposite second end 149 and complementary female snap members attached to another portion of strap 144. Strap assembly 140 may be configured to use other suitable fastening techniques as well.

Docking station apparatus 20 may be fabricated from suitable materials including metal, rubber, resin, natural rubber, neoprene, nitrile, butyl, plastic, crystalline plastic, polyvinylchloride (PVC), polyethylene, polypropylene and other plastic polymers.

Referring to FIGS. 2 and 3, in exemplary embodiment, docking station apparatus 20 has a length "L" of about 15.26 inches, a height "H" of about 6.35 inches and a width "W" of about 16.60 inches. In an exemplary embodiment, sidewall 46 and sidewall 48 each have a thickness of about 1.55 inches and rear wall 44 has a thickness of about 1.75 inches. Other dimensions and thicknesses are possible.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A docking station apparatus for a portable electronic device,
comprising:
a base section;
a support section being attached to the base section and including a bearing surface for receiving a portable electronic device; and
an enclosure structure being attached to the support section for retaining a portable electronic device on the bearing surface, the enclosure structure includes a rear wall and a pair sidewalls configured parallel to each other and contiguous with the rear wall, wherein the bearing surface extends between the sidewalls and wherein the rear wall and sidewalls are substantially perpendicular to the bearing surface,
wherein the base section includes an interior multi-partitioned structure that defines a plurality of compartments,
wherein at least one of the plurality of compartments is a battery compartment to receive a battery, wherein the docking station apparatus further includes electrically conductive members attached to the interior multi-partitioned structure and portions within the battery compartment to contact, electrically, the battery, and wherein the base section includes a door that is movably attached to the base section and is movable to a closed position to prevent access to the battery compartment and to an open position that allows access to the battery compartment.

2. The docking station apparatus according to claim 1, wherein each of the pair of the sidewalls of the enclosure structure includes a cut-out therein to allow access to data ports of a portable electronic device when the portable electronic device is positioned on the bearing surface.

3. The docking station apparatus according to claim 2, wherein each said cut-out includes a first generally vertical surface, a generally horizontal surface contiguous with the first generally vertical surface and a second generally vertical surface contiguous with the generally horizontal surface.

4. The docking station apparatus according to claim 2, wherein each said cut-out includes a first generally vertical surface, a generally horizontal surface contiguous with the first generally vertical surface and a second generally vertical surface contiguous with the generally horizontal surface, and wherein the first generally vertical surface is substantially perpendicular to the generally horizontal surface.

5. The docking station apparatus according to claim 2, wherein each said cut-out includes a first generally vertical surface, a generally horizontal surface contiguous with the first generally vertical surface and a second generally vertical surface contiguous with the generally horizontal surface, and wherein the second generally vertical surface is substantially perpendicular to the generally horizontal surface.

6. The docking station apparatus according to claim 2, wherein each of the pair of sidewalls of the enclosure structure includes an exterior side and an interior side, wherein the interior side confronts a portable electronic device when such portable electronic device is positioned upon the bearing surface, and wherein the docking station further includes at least one electronic signal connector attached to the exterior side of at least one of the sidewalls.

7. The docking station apparatus according to claim 2, wherein each of the pair of sidewalls of the enclosure structure includes an exterior side and an interior side, wherein the interior side confronts a portable electronic device when such portable electronic device is positioned upon the bearing surface, and wherein the docking station further includes at least one electronic signal connector attached to the exterior side of at least one of the sidewalls, and wherein the enclosure structure includes electrical wires extending electrically connected to the electrical signal connector.

8. The docking station apparatus according to claim 2, wherein each of the pair of sidewalls of the enclosure structure includes an exterior side and an interior side, wherein the interior side confronts a portable electronic device when such portable electronic device is positioned upon the bearing surface, and wherein the docking station further includes at least one electronic signal connector attached to the exterior side of at least one of the sidewalls, and wherein the enclosure structure includes electrical wires extending electrically connected to the electrical signal connector, and wherein the docking station apparatus further includes an electrical signal connector on the exterior side of each sidewall of the enclosure structure.

9. The docking station apparatus according to claim 1, wherein the docking station apparatus further includes electrically conductive members attached to the interior multi-partitioned structure and portions within the battery compartment to contact, electrically, the battery.

10. The docking station apparatus according to claim 1, further including electronic circuitry being located within one of the plurality of compartments and being electrically connected to electrically conductive members and electrical wires of the enclosure structure.

11. The docking station apparatus according to claim 1, wherein a door-lock assembly that comprises a door-lock support structure that is attached to the support section and in proximity to the door and a door-lock member that is movably attached to the door-lock support structure, and wherein the door-lock member is movable to a first position that prevents the door from being opened and a second position that allows the door to be opened.

12. The docking station apparatus according to claim 1, further including handles being attached to the base section.

13. The docking station apparatus according to claim 1, further including a support plate being attached to the rear wall of the enclosure structure for engaging a rear side of a portable electronic device for preventing movement of the portable electronic device when such portable electronic device is positioned on the bearing surface.

14. The docking station apparatus according to claim 1, wherein the base section includes a bottom side, wherein the docking station apparatus includes a plurality of corners and a plurality of corner bumper members, and wherein each of the plurality of corner bumper members is attached to a corresponding corner.

15. The docking station apparatus according to claim 14, wherein said each of the plurality of corner bumper members is removably attached to the corresponding corner.

16. The docking station apparatus according to claim 14, wherein said each of the plurality of corner bumper members includes a portion that extends over a portion of the bottom side of the base section so as to create a space between the bottom side and a surface upon which the docking station apparatus is placed.

17. The docking station apparatus according to claim 14, wherein said each of the plurality of corner bumper members includes a plurality of protrusions to contact, physically, one of another object and surface.

18. The docking station apparatus according to claim 14, wherein the corner bumper members are fabricated from a material selected from at least one of rubber, resin, natural rubber, neoprene, nitrile, butyl, plastic, crystalline plastic, polyvinylchloride (PVC), polyethylene and polypropylene.

19. The docking station apparatus according to claim 1, further including a strap assembly being attached to the support section for securing a portable electronic device to the bearing surface.

20. The docking station apparatus according to claim 1, wherein the bearing surface includes at least one section having a raised surface that contacts a bottom side of a portable electronic device when the portable electronic device is positioned on the bearing surface, the raised surface is fabricated from a material that prevents sliding movement of the portable electronic device and damage to the bottom side of the portable electronic device.

21. The docking station apparatus according to claim 20, wherein the raised surface is adjacent to one of the sidewalls of the enclosure structure.

22. The docking station apparatus according to claim 20, wherein said at least one section having the raised surface comprises a panel member attached to the bearing surface.

23. The docking station apparatus according to claim 20, wherein the panel member is fabricated selected from a material consisting of rubber, resin, natural rubber, neoprene, nitrile, butyl, plastic, crystalline plastic, polyvinylchloride (PVC), poly ethylene and polypropylene.

* * * * *